US011526598B2

(12) United States Patent
Nagano

(10) Patent No.: US 11,526,598 B2
(45) Date of Patent: Dec. 13, 2022

(54) MICROCONTROLLER AND SEMICONDUCTOR DEVICE

(71) Applicant: RENESAS ELECTRONICS CORPORATION, Tokyo (JP)

(72) Inventor: Seishiro Nagano, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 500 days.

(21) Appl. No.: 16/682,958

(22) Filed: Nov. 13, 2019

(65) Prior Publication Data
US 2020/0193014 A1 Jun. 18, 2020

(30) Foreign Application Priority Data

Dec. 18, 2018 (JP) .............................. JP2018-236817

(51) Int. Cl.
*G06F 21/60* (2013.01)
*H04L 29/06* (2006.01)
*G06F 21/52* (2013.01)
*G06F 9/46* (2006.01)
*G06F 9/448* (2018.01)

(52) U.S. Cl.
CPC ............ *G06F 21/52* (2013.01); *G06F 9/4488* (2018.02); *G06F 9/468* (2013.01)

(58) Field of Classification Search
CPC ........ G06F 21/52; G06F 9/4488; G06F 9/468; G06F 21/44; G06F 21/51; G06F 21/72; G06F 9/4484
See application file for complete search history.

(56) References Cited

U.S. PATENT DOCUMENTS 7,962,952 B2 6/2011 Saito
2003/0196096 A1* 10/2003 Sutton .................. G06F 21/572
713/181

FOREIGN PATENT DOCUMENTS

JP 2007-148962 A 6/2007

* cited by examiner

*Primary Examiner* — Izunna Okeke
(74) *Attorney, Agent, or Firm* — McDermott Will & Emery LLP

(57) ABSTRACT

A microcontroller includes a CPU and a cryptographic circuit, and when a first program uses the cryptographic circuit, the second program transmits installation information of the first program and encrypted program installation information to the cryptographic circuit. The cryptographic circuit decrypts the encrypted program installation information and compares it with the installation information of the first program. In the case of match, the use of the cryptographic circuit by the first program is permitted.

6 Claims, 12 Drawing Sheets

FIG. 4

| DIRECTORY CONFIGURATION | DESCRIPTION |
|---|---|
| / | ROOT DIRECTORY |
| . . . | |
| /usr | USER DIRECTORY |
| /usr/bin/ | DIRECTORY FOR PROGRAM |
| /usr/bin/program90 | NON-TRUSTED PROGRAM |
| /usr/trustbin | DIRECTORY FOR TRUSTED PROGRAM |
| /usr/trustbin/program80 | TRUSTED PROGRAM |

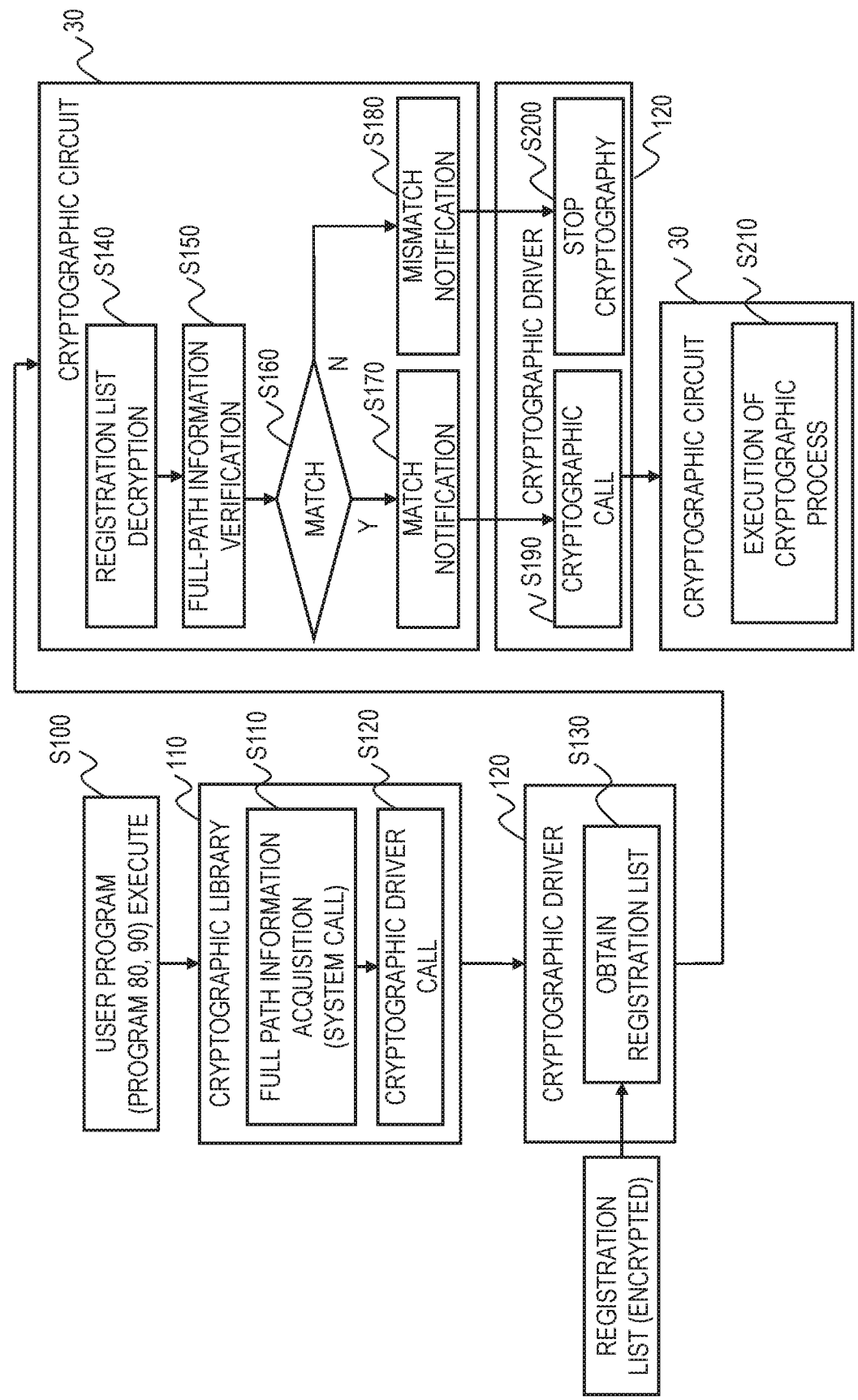

FIG. 7

```
Struct file *exe_file;                              // Currently executing processes (struct task_struct)
Char *pathname;                                     // Stores the full path of the acquired host program.

Char *tmp = (char*)__get_free_page(GFP_TEMPORARY);  // Temporary area including access to file system, etc.
Exe_file = get_task_exe_file(current);              // Obtain currently running process If (!tmp)                                           // Error processing for temporary area acquisition
Return -ENOMEM;

Pathname = d_path(exe_file->f_path, tmp, PAGE_SIZE); // Get the full path from the currently running process and file
system
```

MICROCONTROLLER AND SEMICONDUCTOR DEVICE

CROSS-REFERENCE TO RELATED APPLICATIONS

The disclosure of Japanese Patent Application No. 2018-236817 filed on Dec. 18, 2018 including the specification, drawings and abstract is incorporated herein by reference in its entirety.

BACKGROUND

The present disclosure relates to security techniques in microcontrollers and semiconductor device.

In the microcontroller, various measures are taken to prevent data tampering by a malicious program or leakage of a cryptographic key used for security data processing.

Programs executed by the microcontroller generally have a hierarchical structure such as firmware, an operating system (OS), drivers, middleware (also called libraries), and applications, but security measures must also be taken in consideration of this hierarchical structure.

Patent Document 1 describes a technique related to security measures in consideration of a hierarchical structure of software. More specifically, when a program composed of a main program and a sub-program called from the main program is executed, a return destination address at the time of returning from the sub-program to the main program is acquired. Based on the acquired return destination address, the OS is used to determine whether the main program is in the memory area in the executable state or whether the main program matches the attribute information registered in advance. If the main program is in the memory area in the executable state and the attribute information also matches, the main program is judged to be legitimate, otherwise, it is judged to be illegal, and the execution of the program is stopped.

Here, the sub-program is, for example, a plug-in that provides a security function.

PRIOR-ART DOCUMENT

[Patent Document]
[Patent Document 1] Japanese Unexamined Publication Laid-Open No. 2007-148962

SUMMARY

However, since whether the main program is legitimate or not is realized by software including the OS, security measures are not sufficient. This is because, in the case of software, a technique of falsification and leakage of information using a defect of software is known.

Other objects and novel features will become apparent from the description of the specification and drawings.

Means of Solving the Problems

The microcontroller according to the embodiment includes a CPU and a cryptographic processing circuit, and when a first program uses the cryptographic processing circuit, a second program transmits installation information of the first program and program installation information encrypted in advance to the cryptographic processing circuit. The cryptographic processing circuit decrypts the encrypted program installation information and compares it with the installation information of the first program. In the case of coincidence, the use of the cryptographic processing circuit by the first program is permitted.

The microcontroller according to another embodiment includes a CPU, a cryptographic processing circuit, a memory storing previously encrypted installation information, and a task management circuit, and the task management circuit transmits installation information corresponding to a task to the cryptographic processing circuit at the time of task switching. The cryptographic processing circuit decrypts the encrypted installation information and compares it with the installation information. If there is a match, the use of the cryptographic processing circuit by the switched task is permitted.

In the microcontroller according to one embodiment, the security capability of the microcontroller can be improved.

BRIEF DESCRIPTION OF THE DRAWINGS

FIG. 4 is a directory configuration of the first embodiment.

FIG. 6 is a flow chart showing the operation of the program related to the first embodiment.

FIG. 7 is an example code for acquiring an installation directory of a program in the first embodiment.

DETAILED DESCRIPTION

Figure 1:
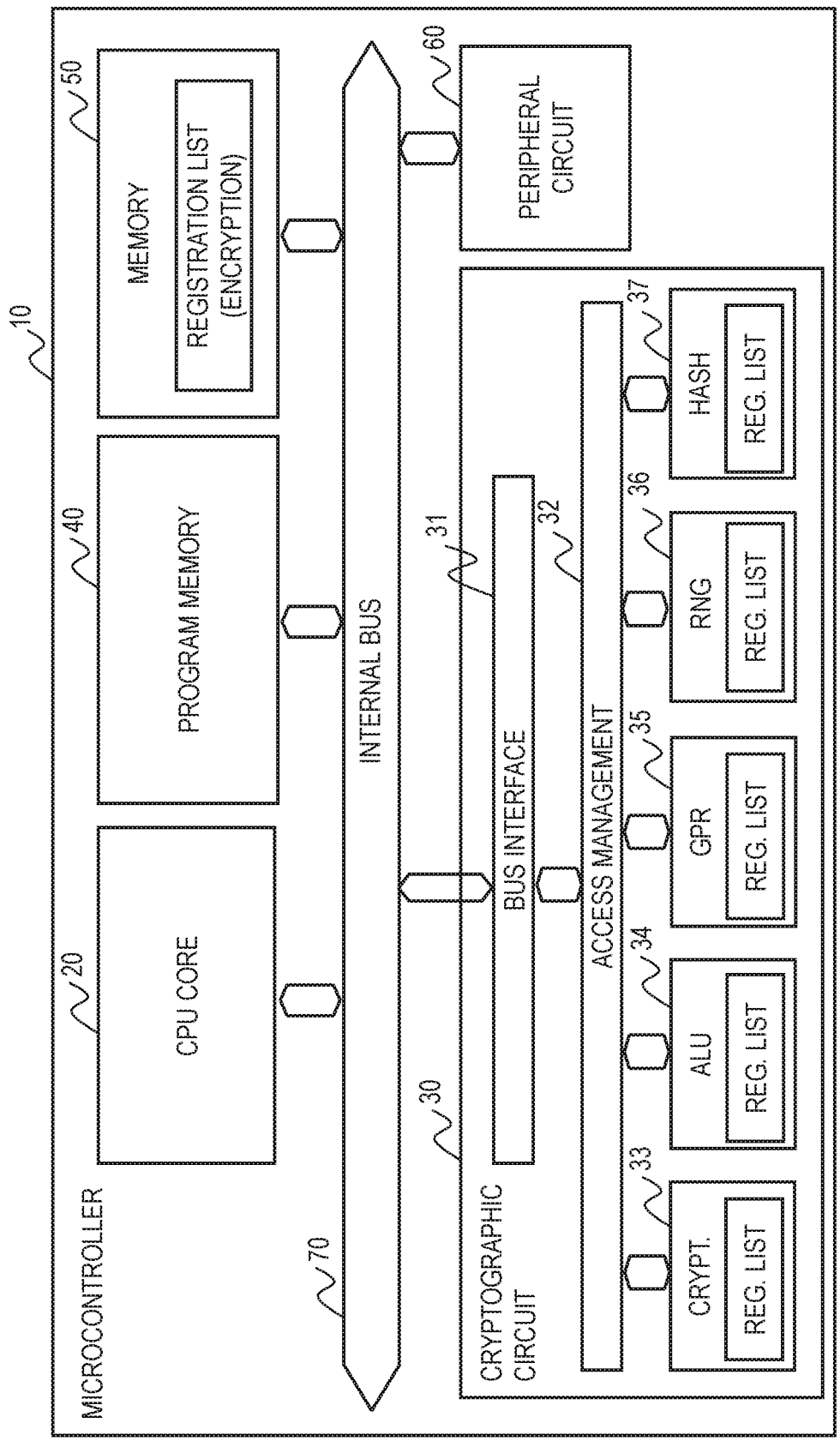
FIG. 1 is a block diagram showing the configuration of the microcontroller according to a first embodiment.

Hereinafter, a microcontroller according to an embodiment will be described in detail with reference to the drawings. In the specification and the drawings, the same or corresponding configuration elements are denoted by the same reference numerals, and a repetitive description thereof is omitted. In the drawings, for convenience of description, the configuration may be omitted or simplified. Also, at least some of the embodiments may be arbitrarily combined with each other.

FIG. 1 is a diagram showing a configuration of a microcontroller according to a first embodiment.

As shown in FIG. 1, a microcontroller 10 includes a CPU (Central Processing Unit) core 20, a program memory 40, a memory 50, an internal bus 70, a cryptographic circuit 30, and a peripheral circuit 60. The microcontroller 10 is preferably constructed on one semiconductor chip, but the program memory or memory may be a separate semiconductor chip.

The CPU core 20 executes various types of software, such as an OS (Operating System), an application program, middleware, driver software for cryptographic circuit, driver software for I/O, and the like, which are stored in the program memory 40. As the program memory 40, a flash memory or a ROM (Read Only Memory) can be used. Also, when the CPU core 20 executes a program stored in the program memory 40, the program may be read directly from the flash memory or ROM, and the program may be expanded to a SRAM (Static Random Access Memory) to read out the program from the SRAM.

The memory 50 stores processing data and processing result data of the CPU core 20 and the cryptographic circuit 30. It consists of SRAM and DRAM (Dynamic Random Access Memory).

The internal bus 70 is a bus through which the CPU core 20, the program memory 40, the memory 50, the cryptographic circuit 30, and the peripheral circuit 60 perform communication based on a predetermined protocol. The internal bus 70 includes an address, data, and a control signal. Although one internal bus is shown in FIG. 1, a plurality of buses may be used. For example, a bus connecting the CPU core 20 and the program memory 40 and a bus connecting the CPU core 20 and the cryptographic processing circuit 30 may be different buses.

The peripheral circuit 60 is a circuit for connecting a wired or radio communication interface, a serial communication interface, a display device, or the like. Although one peripheral circuit is shown in FIG. 1, a plurality of peripheral circuits can be mounted.

The cryptographic circuit 30 is a hardware for performing cryptographic processing, and includes a bus interface 31, an access management 32, a cryptographic engine (CRYPT.) 33, an Arithmetic and Logic Unit (ALU) 34, a general-purpose register (GPR) 35, a random number generation circuit (RNG) 36, and a HASH circuit (HASH) 37.

The bus interface 31 is for performing communication with the internal bus 70, and acquires a request addressed to the cryptographic circuit 30 and returns a processing result of the cryptographic circuit 30.

The access management 32 manages only certain requests to access cryptographic engine 33, ALU 34, and GPR 35. Detailed will be described later.

The cryptographic engine 33 is a hardware for encrypting or decrypting by a specific algorithm with respect to specified information. As the encryption/decryption algorithm, a common key method or a public key method can be used. Specifically, AES (Advanced Encryption Standard), DES (Data Encryption Standard), and RSA (Rivest-Shamir-Adleman cryptosystem) are widely known as the common key system and can be used in present embodiment.

The ALU 34 is a hardware for performing arithmetic processing related to cryptographic processing. More specifically, additional calculations and comparisons are performed on the results processed by the cryptographic engine 33, the random number generation circuit 36, and the HASH circuit 37.

The general-purpose register 35 stores treatment data for performing cryptographic processing and processing result data. Preferably, an access to the general purpose register 35 is granted only from the cryptographic engine 33 and the ALU 34 by access management 32.

The random number generation circuit 36 is a circuit for generating a random number, and preferably generates an intrinsic random number. The HASH circuit 37 is a circuit that generates hashing values for inputted data by using particular algorithms. As the algorithms, the SHA-0, the SHA-1, the SHA-2, and the SHA-3 of SHA (Secure Hash Algorithm) are widely known, and they can also be used in present embodiment.

Next, the software operating on the micro controller 10 according to the present embodiment will be described.

Figure 2:
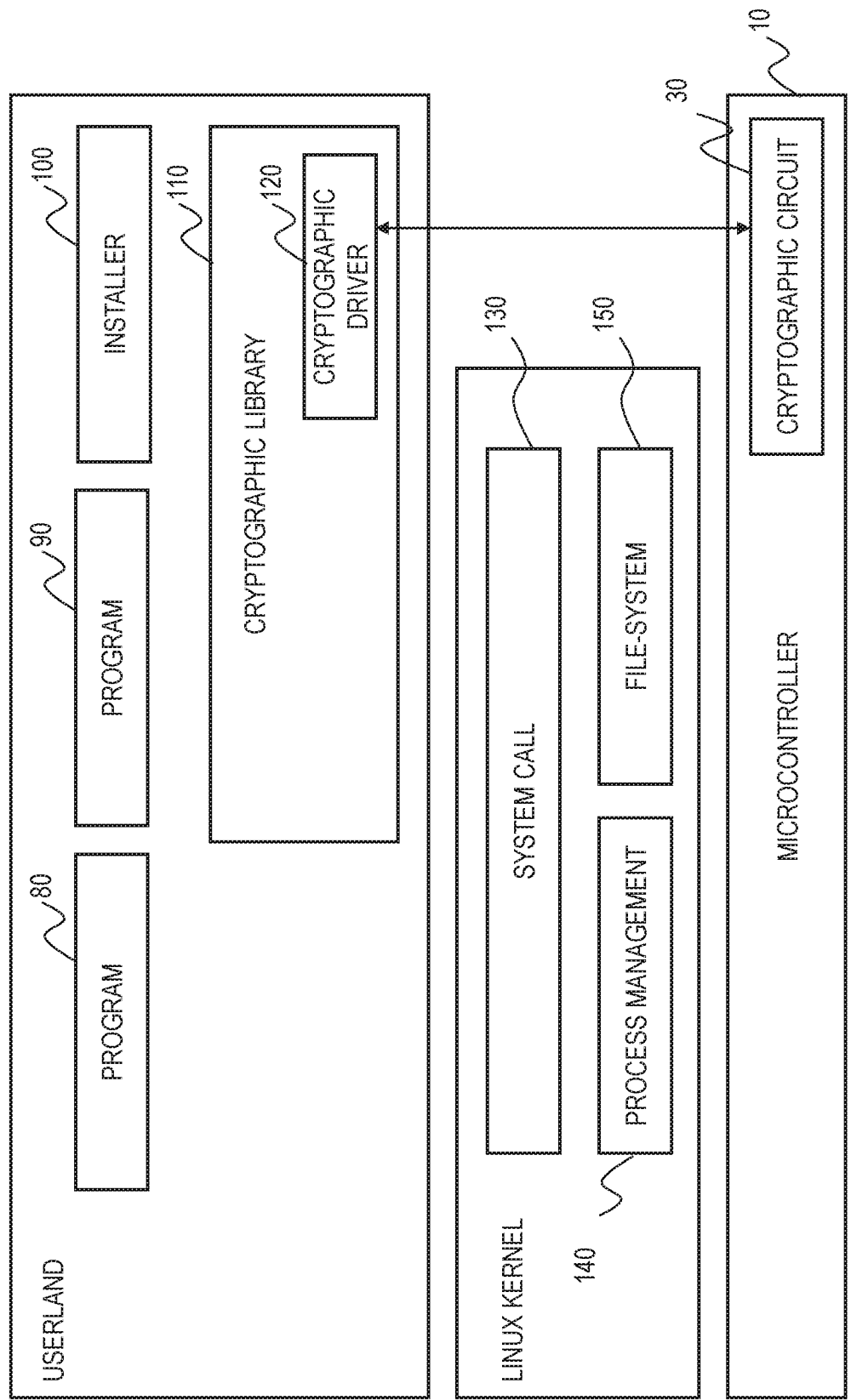
FIG. 2 is a block diagram of a software stack on the microcontroller according to the first embodiment.

FIG. 2 is a block diagram of a software stack on a microcontroller according to the first embodiment, and is an example using Linux as an OS of the microcontroller 10. The Linux (registered trademark) is roughly composed of a kernel and a user land (portion other than the kernel). Both the kernel and userland are actually made up of a large number of elements, but only those portions that are directly related to present embodiment are described here. The kernel includes functions such as a system call 130, a process management 140, and a file system 150, and the user land includes programs 80 and 90, an installer 100, and a cryptographic library 110.

The system call 130 is a function that is called when an application program (process) uses the function of the OS. It is also used when an application calls another application. The process management 140 performs process creation and process management according to the priority set for each process. The file system 150 manages executable files and data files by a directory.

The cryptographic library 110 is a program library (function group) for performing cryptographic processing. When a user who uses the microcontroller 10 develops an application program for performing cryptographic processing by hardware, the application program can be realized by calling the cryptographic library. The cryptographic library 110 can use the function of the cryptographic circuit 30 via the cryptographic driver 120. In response to a request from the user program, the cryptographic library 110 processes data to be transmitted to the cryptographic circuit 30 and returns a response from the cryptographic circuit 30 to the user program.

Figure 3:
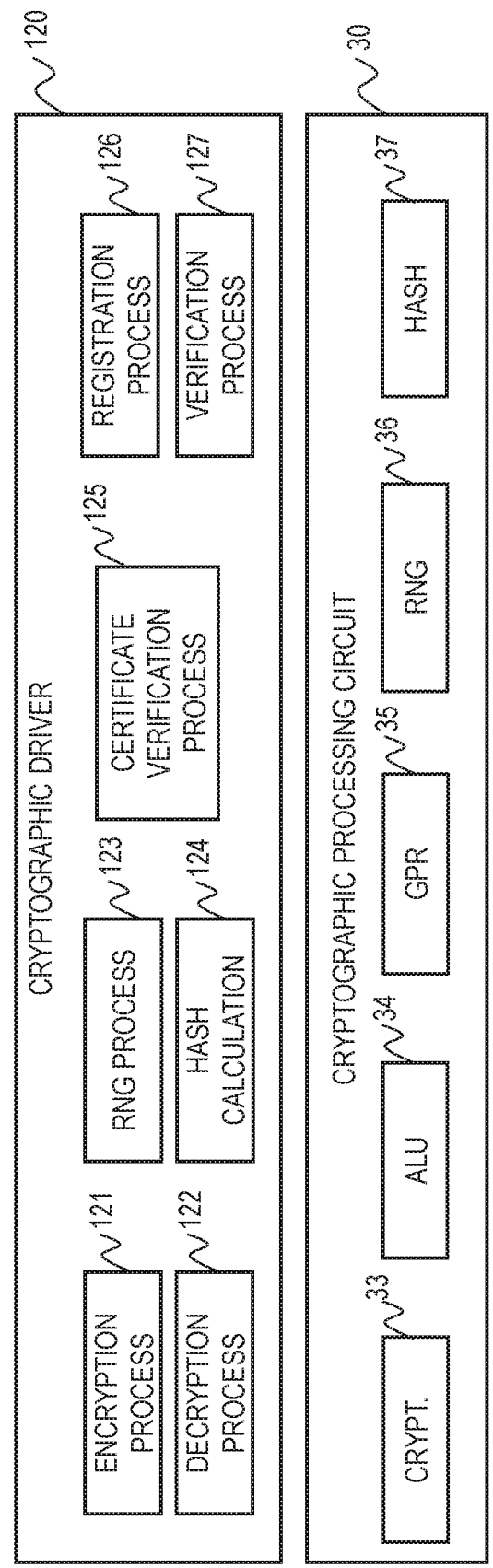
FIG. 3 is a block diagram of cryptographic drivers and cryptographic processing circuits according to the first embodiment.

FIG. 3 is a block diagram of the cryptographic driver and the cryptographic circuit according to the first embodiment, and is a block diagram of the cryptographic driver 120. The cryptographic driver 120 includes an encryption process 121, a decryption process 122, a random number generation (RNG) process 123, a HASH calculation process 124, a certificate verification process 125, a registration process 126, and a verification process 127. Each process is defined in the form of functions, and receives a call from the cryptographic library 110, and issues a processing request to a corresponding circuit in the cryptographic circuit 30, that is, the cryptographic engine 33, the ALU 34, the general-purpose register 35, the random number generation circuit 36, and the HASH circuit 37. The processing result of each circuit is returned to the application program via the cryptographic library 110.

The encryption process 121 performs a specific encryption process, and performs process using the encryption engine 33 of the encryption circuit 30. As described above, the cryptographic engine 33 corresponds to an encryption algorithm such as AES, DES, or RSA, and which encryption algorithm is used is specified by the application program. Alternatively, it may be determined based on a preset rule. Similarly to the encryption process 121, the decryption process 122 also performs decryption using an algorithm specified by the cryptographic engine 33 for the encrypted data.

The random number generation (RNG) process 123 is for generating a random number related to the encryption process 121, and performs a process using the random number generation circuit 36 of the cryptographic circuit 30. The random number generated by the random number generator 36 may be processed by ALU 34. The random number is used, for example, as original data of the key. The HASH calculation 124 is for generating a hash value for the input data, and performs using the HASH circuit 37. The hash value is used, for example, for authentication. The hash value outputted from the HASH circuits 37 may be processed by ALU 34.

The certificate verifying process 125 verifies whether or not an obtained certificate is valid, and performs the process using the cryptographic engine 33 of the cryptographic circuit 30, the ALU 34, and the HASH circuit 37. For example, in order to confirm whether a communication partner is authentic, a verification is performed using a certificate obtained from the communication partner and a certificate (root certificate) obtained from the certificate authority that issued the certificate. More specifically, first, when a certificate is legitimate, the certificate contains a public key and a signature of the certificate authority. The signature is data encrypted using a secret key of the certificate authority with respect to the hash value of the content of the certificate. The microcontroller 10 obtains the root certificate in advance, and decrypts the signature in the certificate obtained from the communication partner using the public key contained in the root certificate. If decryption is not possible, the certificate of the communication partner is not legitimate. Further, the microcontroller 10 calculates a hash value from the contents of the certificate obtained from the communication partner, and compares the hash value with the decrypted signature, i.e., the hash value. If the certificate is authentic, these values match, so that it is understood that the communication partner is authentic.

The registration process 126 is a process for registering a program for which the use of the cryptographic circuit 30 is permitted. The information of the registered program is stored in the memory 50 as a registration list, but is encrypted using the cryptographic engine 33 of the cryptographic circuit 30 before being stored in the memory 50. The program information is added to the registration list after the encrypted registration list is read from the memory 50 and decrypted using the cryptographic engine 33. After the program information is added, the registration list is encrypted again using the cryptographic engine 33, and then stored in the memory 50. In other words, since the encrypted registration list is always stored in the memory 50, even if a program directly accesses the registration list, the content of the registration list cannot be known or datum cannot be added.

The verification process 127 is a process for verifying whether or not the program to be used by the cryptographic circuit 30 is a program registered in advance in the registration list. Before the program performs the encryption process 121, the decryption process 122, the random number generation process 123, the HASH calculation 124, and the certificate verification process 125, first, the verification process 127 verifies whether or not the program is registered in the registration list. As a result of the verification, if the program is registered in the registration list, the execution of the cryptographic process by the cryptographic circuit 30 is permitted. In the case of a program which is not registered in the registration list, the subsequent process of the program is stopped.

The description will return to FIG. 2. The program 80 is an application program developed by a user using the microcontroller 10, and uses the cryptographic circuit 30. In the present embodiment, this program 80 will be described as a program developed by an authorized user of the microcontroller 10. On the other hand, the program 90 is an application program that uses the cryptographic circuit 30 in the same manner as the program 80, but is not a legitimate user but a program prepared by a malicious user to acquire confidential information or to prevent normal operation of the microcontroller 10.

The installer 100 is a program for installing an application program in the microcontroller 10. Here, the installation of the program by the installer 100 can be executed only by a user who is specially authorized, which is called a privileged user or a super user.

FIG. 4 is a directory structure diagram related to the first embodiment, and shows an exemplary directory configuration when Linux (registered trademark) is used as the operating system. In present embodiment, programs installed by an authorized user using the installer 100 are stored in a directory "/usr/trustbin". Therefore, the program 80, which is a normal program, is stored in the /usr/trustbin. On the other hand, it is assumed that the program 90 created by a malicious user are stored in the /usr/bin instead of the /usr/trustbin.

Next, an exemplary operation of the microcontroller 10 when the installer 100 according to the present embodiment is executed will be described.

Figure 5:
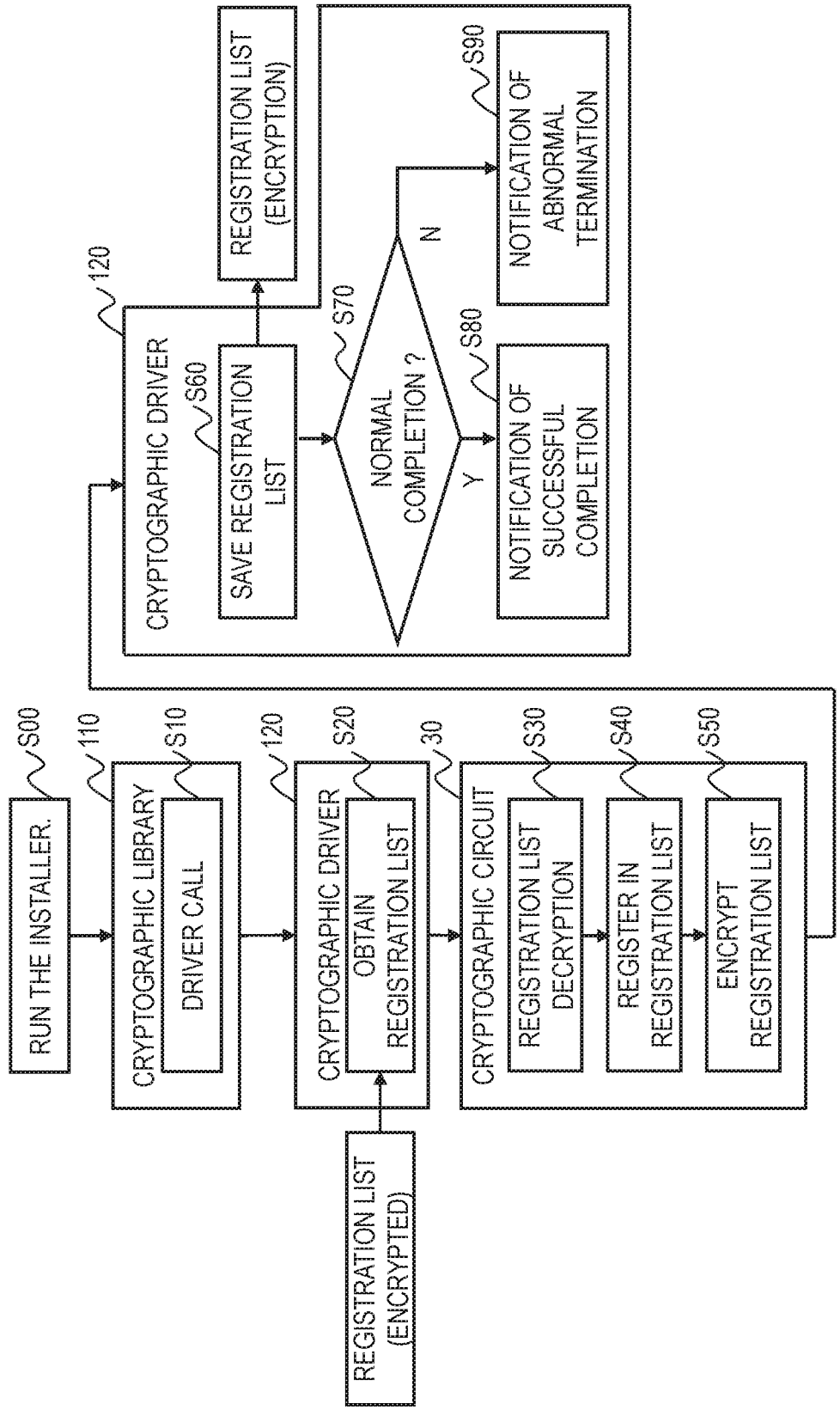
FIG. 5 is a flow chart showing how to install and register a program related to first embodiment.

FIG. 5 is a flow chart showing how to install and register programs related to the first embodiment, and is an operation flow of the microcontroller when the installer 100 is executed.

First, a case of installing the program 80 of the authorized user will be described. In step S00, the super user starts the installer 100 and starts the installation process of the program 80. In operation S10, the installer 100 installs the program 80 in the /usr/trustbin and calls the functions of the registration process 126 of the cryptographic driver 120 via the cryptographic library 110. The argument at the time of calling the functions of the registration process 126 are the install information of the program 80, "/usr/trustbin/program80".

In step S20, the function of the registration process 126 of the cryptographic driver 120 acquires the encrypted registration list stored in the memory 50 in response to the call. Then, the acquired registration list and "usr/trustbin/program80" which is the installation information of the program 80 are transmitted to the cryptographic circuit 30, and a request is made for decryption of the registration list, registration of the installation information of the program 80 in the registration list, and encryption of the registration list.

The cryptographic circuit 30 decrypts the received registration list (step S30), and registers "usr/trustbin/program80" in the decrypted registration list (step S40). After the registration, the registration list is encrypted, and the encrypted registration list is transmitted to the cryptographic driver 120 in step S50. In step S60, the cryptographic driver 120 stores the encrypted registration list in the memory 50. It is determined whether or not the storage of the encrypted registration list in the memory 50 has been completed normally (step S70), and if the storage has been completed normally, the cryptographic driver 120 notifies the installer that the storage has been completed normally (step S80), and the installer 100 completes the installation of the program 80 normally. If the installer ends abnormally, the installer ends abnormally and notifies an error in step S90.

Installation of the malicious user's program 90 will now be described. A malicious user who does not know how to become a superuser cannot start the installer 100. Therefore, the program 90 is installed by some kind of fraud. As a result, for example, it is assumed that the program 90 is stored in the directory "/usr/bin". However, even if the program can be installed due to an illegal act, the installer 100 cannot be started, and therefore the installation information of the program 90, i.e., "/usr/bin/program90" cannot be registered in the registration list.

As a result of the installation of the program 80 and the program 90, the encrypted registration information stored in the memory 50 stores the installation information of the program 80, "/usr/trustbin/program80", but the installation information of the program 90 is not stored.

Next, an exemplary operation of the microcontroller 10 at the time of executing the user program related to the present embodiment will be described.

FIG. 6 is a flowchart showing the operation of the program related to the first embodiment, and is a flowchart for explaining the operation of the microcontroller 10 when the user program is executed.

First, a case where the program 80 of the authorized user is executed will be described. Here, for example, the program 80 has a function of performing encryption processing on predetermined information. When the program 80 is executed, a function of the encryption process 121 of the cryptographic driver 120 is called and the encryption processing circuit 30 is used.

When the program 80 is executed (step S100), the cryptographic library 110 is called. Prior to executing the encryption process functions, the called cryptographic library 110 performs a system call 130 to check the installation directory of the calling program 80, and acquires the full-path data of the installation directory (step S110). FIG. 7 is an example of a code for acquiring an install directory of a program related to first embodiment, and is an example of a process program code for acquiring full-path data. By executing this code, the full path information can be obtained based on the process information being executed and the name of the execution file. In step S120, the cryptographic library 110 calls functions of the verification process 127 of the cryptographic driver 120 using the acquired full-path data as arguments.

The function of the verification process 127 of the cryptographic driver 120 acquires the encrypted registration list stored in the memory 50 in response to the call. Then, the acquired registration list and "/usr/trustbin/program80" which is the installation information of the program 80 are transmitted to the cryptographic circuit 30, and the decryption of the registration list and the verification of the decrypted registration list and the installation information of the program 80 are requested (step S130).

The cryptographic circuit 30 decrypts the received registration list (step S140) and checks whether the installation information "/usr/trustbin/program80" of the program 80 has been registered in the decrypted registration list (step S150) to determine whether it matches (step S160). As a result of the collation, program 80 is registered, and the result of the matching is notified to cryptographic driver 120 (step S170).

After receiving the matching result from the cryptographic circuit 30, the cryptographic driver 120 permits the program 80 to execute the cryptographic processing using the cryptographic circuit 30 in steps S190 and S210.

The execution of the program 90 by a malicious user will now be described. Since the program 90 is not installed using the installer 100 as described above, the installation information is not registered in the registration list. Therefore, in the collation processing of the cryptographic circuit 30, the result of the collation mismatch is obtained in step S180. Upon receipt of the result of the mismatch, the cryptographic driver 120 stops the subsequent processing of the program 90 (step S200). More preferably, when a mismatch occurs, the access management does not receive subsequent access to the cryptographic circuit 30.

As described above, in the microcontroller according to the present embodiment, when the user program executes the cryptographic processing using the cryptographic circuit, the microcontroller uses the cryptographic circuit to determine whether or not the program is an object of the authorized user. This makes it possible to limit the use of the cryptographic circuit by a malicious user program and to keep the microcontroller secure.

Modified Example

Figure 8:
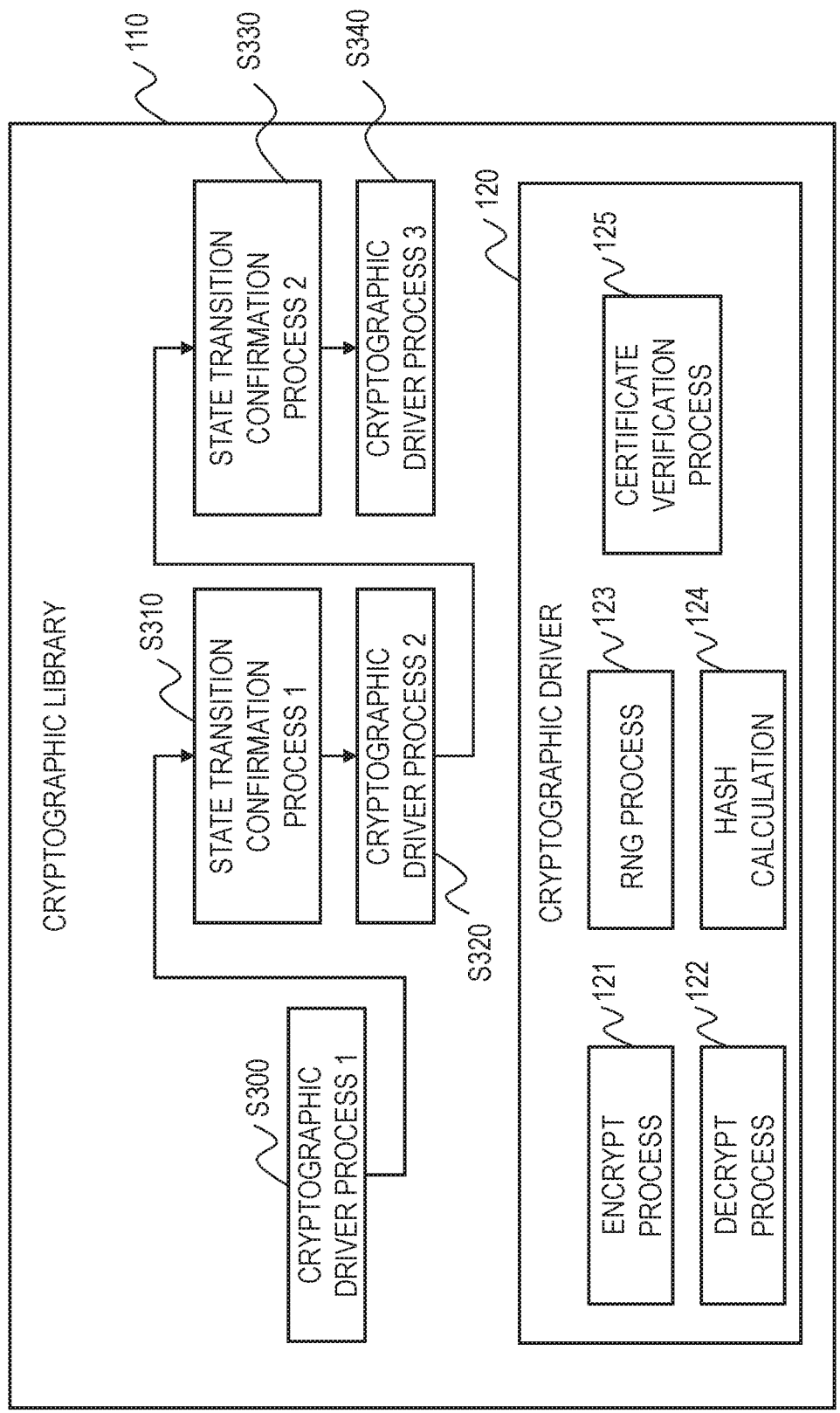
FIG. 8 is a block diagram showing a configuration example of a cryptographic library in a modified example of the first embodiment.

FIG. 8 is a block diagram showing an exemplary configuration of the cryptographic library 110 according to a modified example of the first embodiment. The present modified example is characterized in that the cryptographic library 110 has a state-transition checking process. The cryptographic library 110 is a group of functions operated by a call from a user program, and FIG. 8 illustrates one of the functions. This function is configured to call three cryptographic driver processes in the cryptographic driver 120, and each of the three cryptographic driver processes corresponds to one of the encryption process 121, the decryption process 122, the random number generation (RNG) process 123, the HASH calculation 124, and the certificate verification process 125 of the cryptographic driver 120.

The state transition confirmation process 1 (S310) confirms whether or not the cryptographic driver process 2 (S320) is started after the cryptographic driver process 1 (S300) is performed. Similarly, the state transition confirmation process (S330) is for confirming whether or not the cryptographic driver process 3 (S340) is started after the cryptographic driver process 2 (S320) is performed. When the cryptographic driver process 2 (S320) is started at a timing other than the timing after the process of the cryptographic driver process 1 (S300), the state transition confirmation process 1 (S310) abnormally terminates the user program, which is the calling source of the cryptographic driver process 2, on the assumption that the user program is being illegally accessed. The same applies to the state transition confirmation process 2 (S330). Whether or not the processes of the cryptographic driver process 1 and the cryptographic driver process 2 have been completed can be realized by setting a flag when the respective processes have been completed.

Figure 9:
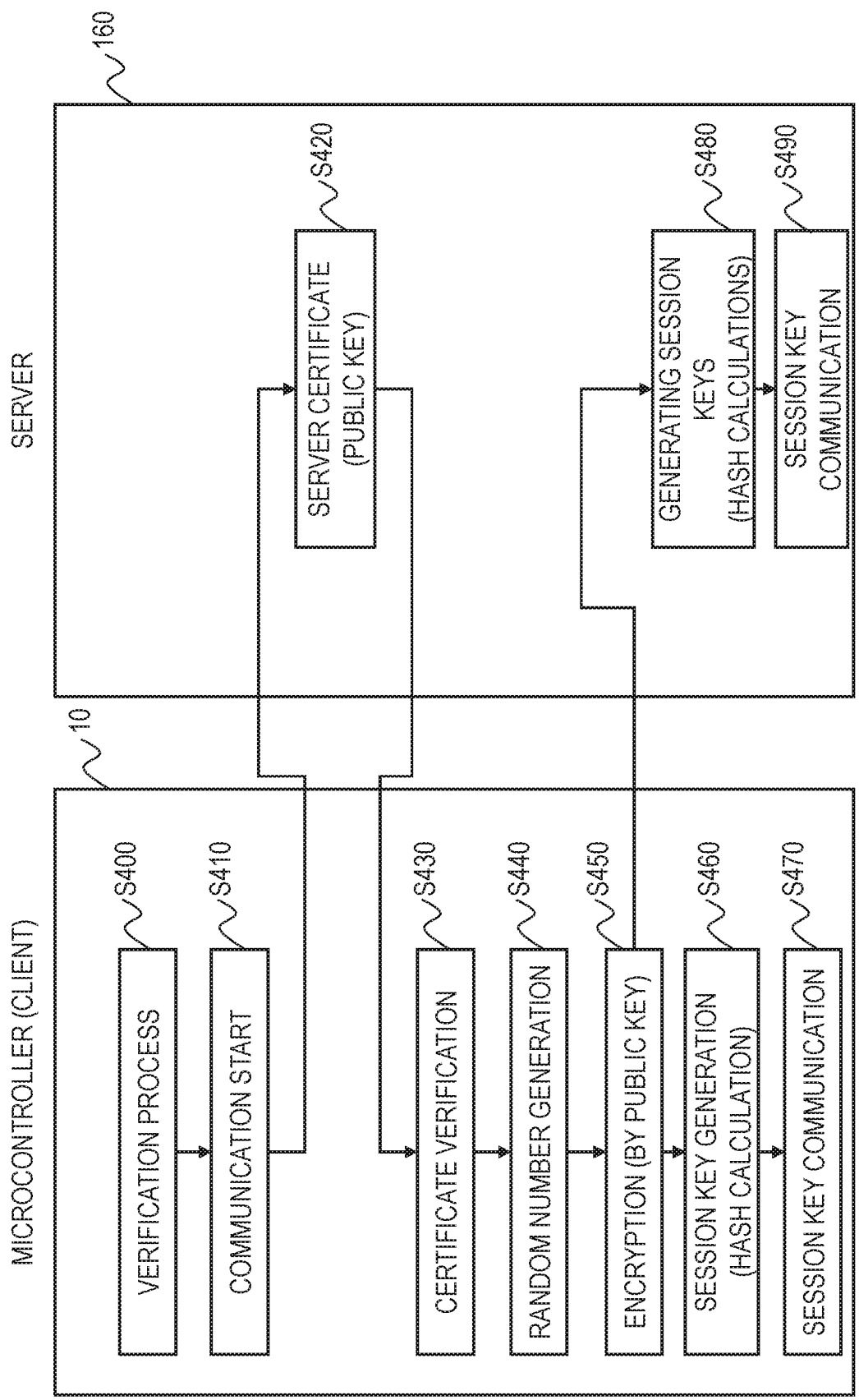
FIG. 9 is a flow chart showing examples of operations in the modified example of the first embodiment.

A more specific description will be given with reference to FIG. 9. FIG. 9 is a flowchart showing an example of the operation related to the modified example of the first embodiment, and is a flowchart showing an example of the communication using the TSL (Transport Layer Security) which is often used in the secure communication of the Internet. This is an example in which the user program is configured to perform communication using the TSL, and encryption and verification of certificates required for the TSL are performed using the encryption circuit 30.

First, whether the user program using the TSL is a program of an authorized user is confirmed by a verification process (S400). The verification process (step S400) has the same content as the verification process of the program described in first embodiment, and therefore the explanation thereof is omitted. The treatment after the verification process (steps S410~S490) is executed when the collation is matched in the verification process (step S400). If a mismatch occurs in the verification process (step S400), the program using the TSL is regarded as a malicious user, and the subsequent processes (steps S410~S490) are not executed.

The communication start (step S410), certificate verification (step S430), random number generation (step S440), encryption (step S450), session key generation (step S460), and session key communication (step S470) of FIG. 9 are processes by the cryptographic driver 120, and when the cryptographic library 110 receives a TSL communication request from an application program, the processes of the cryptographic driver 120 are activated in the flow shown in FIG. 9. Then, as described with reference to FIG. 8, before each process of the cryptographic driver 120 is started, a state transition confirmation process for confirming whether or not a predetermined cryptographic driver process has been completed is executed (the state transition confirmation process part is not shown in FIG. 9).

When the TSL communication is started, the microcontroller 10 transmits a TSL communication start message to the server 160 of the communication destination in step S410. The server 160 receives the TSL communication start message and transmits the server certificate to the microcontroller 10 (step S420). A public key is attached to the server certificate. Incidentally, the messages to be transmitted include information specifying which algorithms are used in encryption, random number generation, and HASH calculation to be performed thereafter.

When the microcontroller 10 receives the server certificate from the server 160, the microcontroller 10 starts the process of verifying the certificate, and checks whether or not the communication start process has been executed prior to the process of verifying the certificate, step S430. If the communication start process has been executed, the certificate verification process is started. If the communication start process is not executed, the subsequent process is stopped. Certificate verification verifies whether the server certificate is valid by obtaining the root certificate from a certificate authority that issued the server certificate, and using the root certificate.

Next, the random number generation is started, and it is checked whether or not the certificate verification process has been executed prior to the random number generation in step S440. If the certificate verification process is not executed, the subsequent processing is stopped.

Next, the encryption process is started, and it is checked whether or not the random number generation has been executed prior to the encryption process in step S450. If the random number generation is not executed, the subsequent process is stopped. In the encryption process, a random number generated in the random number generation is encrypted using the public key attached to the server certificate. The encrypted random number is also transmitted to the server, and is shared by the microcontroller 10 and the server 160.

Next, the session key generation process is started, and it is checked whether or not the encryption process has been executed prior to the session key generation process in step S460. If the encryption process is not executed, the subsequent process is stopped. In the session key generation process, a session key is generated by performing HASH calculation using the random number generated in the random number generation process. The server 160 can also decrypt the encrypted random number transmitted from the microcontroller 10 and perform HASH calculation using the decrypted random number to generate the same session key as the session key of the microcontroller 10. The generated session key is used in the subsequent cryptographic communication between the microcontroller 10 and the server 160.

As described above, according to the present modified example, it is confirmed whether or not a certain cryptographic driver process is in an execution state prior to the activation of the cryptographic driver process, that is, a state in which a predetermined another process of the cryptographic driver is executed. Thus, even if a malicious program passes through the process of registering and collating a user program described in first embodiment, the program must maintain a predetermined flow of cryptographic driver processing, i.e., a processing flow for maintaining a secure state, and the secure state of the microcontroller 10 can be maintained.

Second Embodiment

Figure 10:
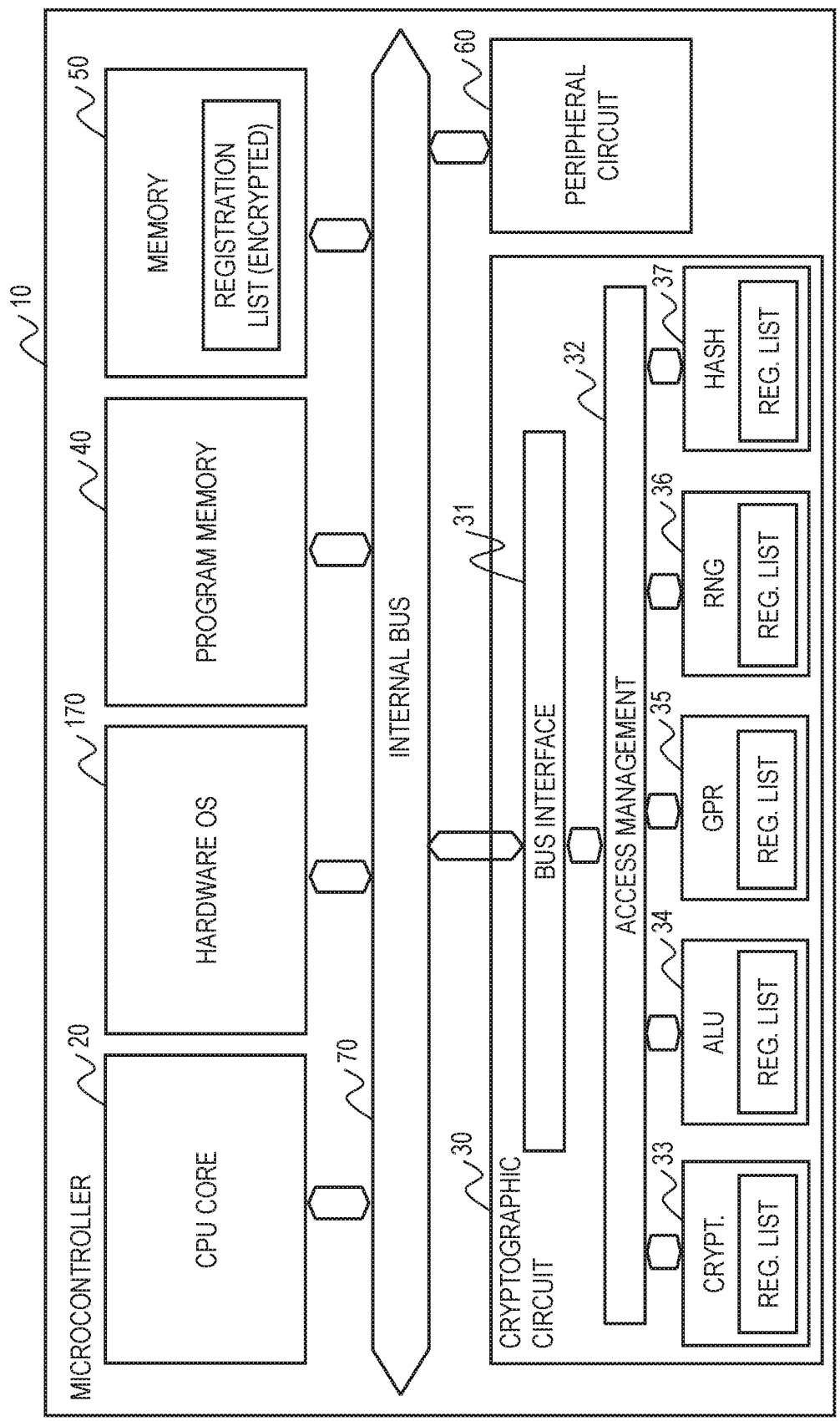
FIG. 10 is a block diagram showing a configuration of a microcontroller according to a second embodiment.
Figure 11:
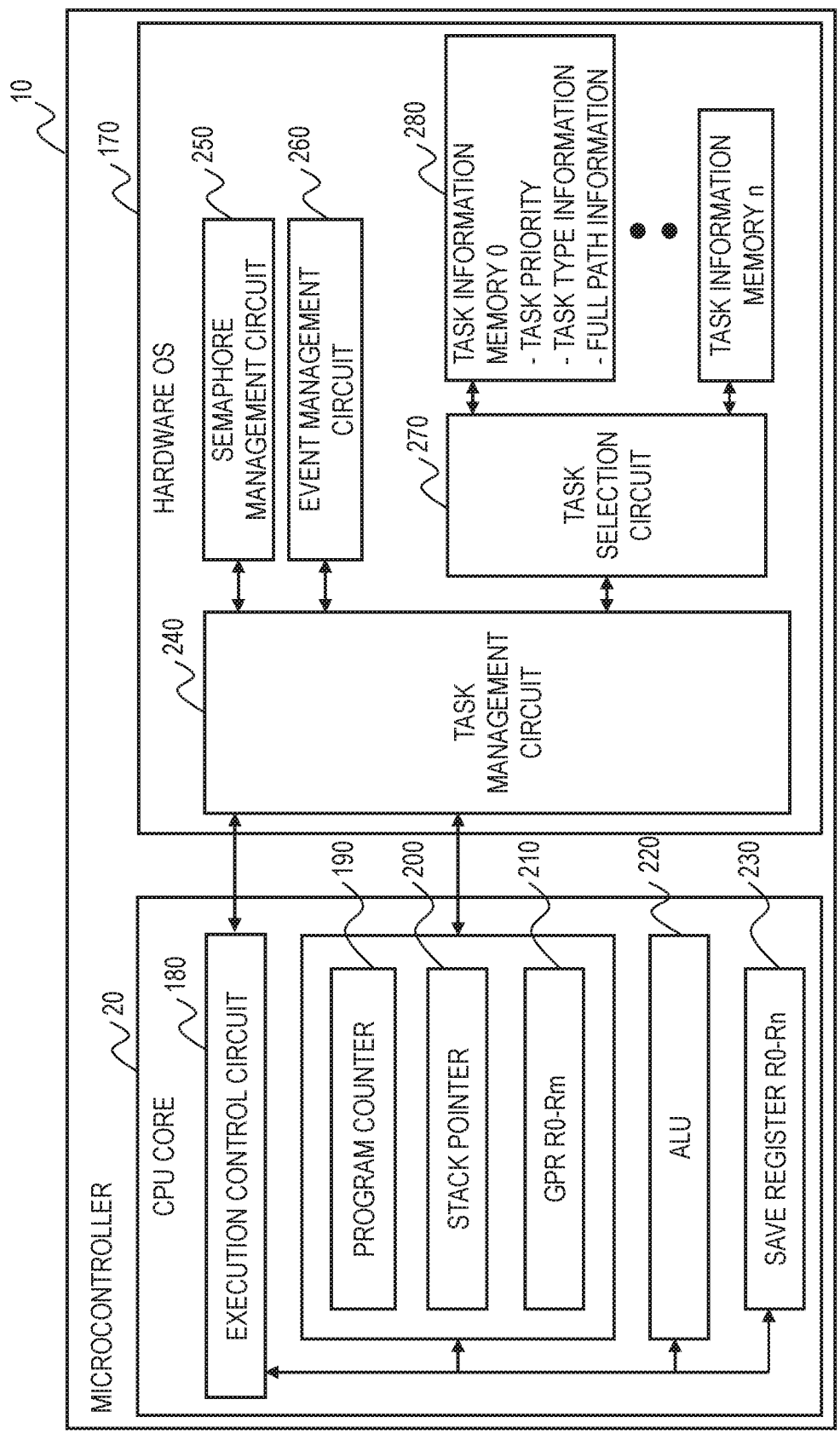
FIG. 11 is a block diagram of the CPU-core and hardware-OS related to the second embodiment.

FIG. 10 is a block diagram showing the configuration of a microcontroller according to the present second embodiment. The difference from FIG. 1 is that a hardware OS 170 is added. Although the hardware OS 170 is connected to the internal bus 70 in FIG. 10, the hardware may be connected to the CPU core 20 by a dedicated bus instead of the internal bus 70. FIG. 11 is a block diagram showing the configuration of the CPU core 20 and the hardware OS 170 of FIG. 10. Blocks other than the CPU core 20 and the hardware OS 170 are omitted because they are the same as in FIG. 1.

The CPU core 20 includes an execution control circuit 180, a program counter 190, a stack pointer 200, general purpose registers (GPR) 210 (R0 to Rm), an ALU 220, and save registers 230 (R0 to Rn). The execution control circuit 180 controls the execution of tasks by managing and controlling the program counter 190, the general purpose registers 210 (R0 to Rm), the memory 50, and the ALU 220. Here, the CPU core 20 is a multitasking CPU core.

The stack pointer 200 and the save registers 230 (R0 to Rn) are used when a task switching occurs. When the execution control circuit 180 executes a system call or when a task switch occurs due to an interrupt from the outside, a task process currently being executed is interrupted, and the information (context) of the task at the time of the interruption is saved in the save register 230 indicated by the stack pointer 200. Here, the context includes not only the value of the program counter 190 and the value of the general purpose register 210, but also the full-path information of the installation directory of the task (program) in present embodiment and a type information of the task. The task type information is information indicating whether the task is a process of the cryptographic library 110. The full-path information of the install directory and the cryptographic library 110 are the same as those described in the first embodiment, and therefore their descriptions are omitted here.

When a context is switched to the task saved in the save register 230, a context of the task saved in the save register 230 is returned to the program counter 190 and the general-purpose register 210, and restarted from the time when the task is interrupted. The save destination of the context may be the memory 50 instead of the save register 230.

The hardware OS 170 is a hardware configuration in which a part of the functions of the operating system configured by software is used as a circuit. More specifically, process management is included as a hardware function. Therefore, the hardware OS 170 is also referred to as a process management circuit or a task management circuit. The hardware OS 170 includes a task management circuit 240, a semaphore management circuit 250, an event management circuit 260, a task selection circuit 270, and task information memories 280 (0-n).

The task information memory 280 (0 to n) stores information on a priority of a task, task type information, and full path information of the installation directory of a task (program) among context information on tasks that can be executed by the CPU core 20, i.e., tasks that are being executed or tasks waiting for execution. The priority of the task is set in advance by the program designer, and the task is selected and switched on the basis of the priority.

The task management circuit 240 executes task switching when the execution control circuit 180 executes a system call indicating task switching or when an interrupt request is received from the outside (not shown). When the task switching is requested, the task management circuit 240 instructs the task selection circuit 270 to select a task. The task selection circuit 270 selects a task to be executed next based on the priority of each task stored in the task information memory 280 (0 to n), the semaphore information of the semaphore management circuit 250, and the event information of the event management circuit 260, and notifies the task management circuit 240 of the information of the selected task.

The task selection circuit 270 also determines whether the selected task is a cryptographic task, i.e., process using the cryptographic library 110, based on the task type information. If the selected task is a cryptographic task, the task management circuit 240 is also notified of the full path information of the directory in which the task (program) that called the cryptographic task is installed.

The task management circuit 240 causes the CPU core 20 to switch tasks based on the task selected by the task selection circuit 270 and the full path information.

Here, the semaphore management circuit 250 and the event management circuit 260 will be described.

The semaphore management circuit 250 is a circuit for performing exclusive control when a resource shared among a plurality of tasks (the memory 50, the general-purpose register 210, and the peripheral circuit 60) is used. When a semaphore is set for a shared resource and the semaphore is acquired by a task, another task cannot use the shared resource until the semaphore is released, and another task is in a waiting state. The semaphore is set and managed by the semaphore management circuit 250. More specifically, when a certain task being executed by the execution control circuit 180 acquires a semaphore, a system call for acquiring the semaphore is executed, and when the semaphore is released, a system call for releasing the semaphore is executed. Based on these system calls, the semaphore management circuit 250 manages which task is acquiring the semaphore and which task is waiting to acquire the semaphore.

The event management circuit 260 is a circuit for synchronizing a plurality of tasks. For example, suppose there are three tasks A, B, and C. When it is desired to execute tasks A, B, and C in this order, it can be realized by setting and managing an event flag notifying that each task is finished. That is, the task B can know the execution timing by checking the event flag indicating that the execution of the task A is completed. The same applies to task C. The event flag is set and managed by the event management circuit 260. More specifically, when a task being executed by the execution control circuit 180 sets an event flag, a system call for setting the event flag is executed. Based on this system call, the event management circuit 260 sets and manages the event flag.

Next, an exemplary operation of the microcontroller according to the present second embodiment will be described.

Figure 12:
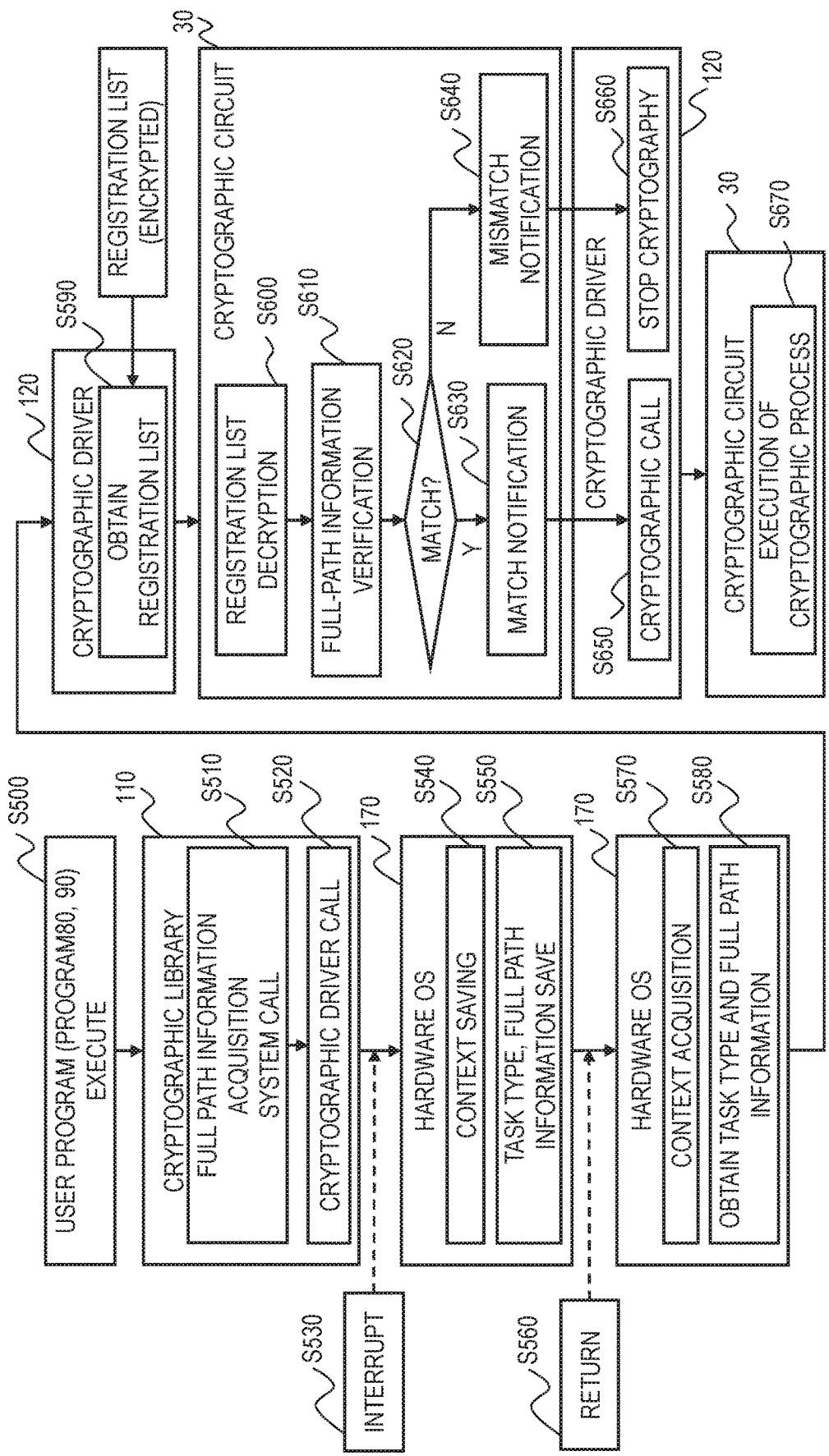
FIG. 12 is a flow chart showing an operation of a program related to the second embodiment.

FIG. 12 is a flowchart showing the operation of the program related to the second embodiment, and is a flowchart for explaining the operation of the microcontroller 10 when the user program is executed. Since the entire operation is the same as that of the first embodiment, the hardware OS 170, which is characteristic of the present second embodiment, will be mainly described.

First, the program 80 of the authorized user or the program of the malicious user is executed, and the cryptographic library 110 is called (step S500). In step S510, the called cryptographic library 110 performs a system call to acquire the full-path information of the install directory of the calling program 80 or 90. After acquiring the full-path information, the cryptographic library 110 calls the cryptographic driver 120 (step S520).

As described in the first embodiment, the cryptographic driver 120 causes the cryptographic circuit 30 to verify the full-path information after the cryptographic driver 120 is called, and the cryptographic circuit 30 performs verification of the full-path information when the task is switched (step S530) by an external interrupt. In this case, the hardware OS 170 saves the context information of the program 80 being executed by the CPU core 20 to the save register 230 in step S540. Further, the hardware OS 170 stores the information indicating that the program 80 includes the task of the cryptographic process and the full-path information of the install directory of the program 80 in the task information memory 280 in step S550. The same applies to the program 90.

Next, step S560 will be described in which the process of the task by the interrupt ends and the program returns to the program 80. The hardware OS 170 saves the context of the task being executed by the CPU core 20 to the save register 230. When the task selecting circuit 270 selects switching to the task saved in the steps S540 and S550 as a result of considering the semaphores, events, and task priorities, the hardware OS 170 (task managing circuit 240) returns the context of the program 80 saved in the saving register 230 to the program counter 190 and the general-purpose register 210 (step S570). The hardware OS 170 further acquires the full-path information stored in the task information memory 280 and the information indicating the task of the cryptographic process (step S580), thereby causing the CPU core to restart the execution of the program 80, that is, the execution of the cryptographic driver 120. The same applies to the program 90.

When the program 80 is restarted, the cryptographic driver 120 acquires the registration list from the memory (step S590), and the cryptographic circuit performs the verification of the full-path information (step S600); however, the explanation of the cryptographic circuit is omitted here because it is the same as first embodiment. In the case of the program 80, since the full-path information is registered in the registration list, the processing by the cryptographic circuit 30 is normally executed in step S670. On the other hand, in the case of program 90, since it is not registered in the registration list, processing by cryptographic circuit 30 is not performed (step S660).

In the present second embodiment, the full-path information of the installation directory of the programs is stored in the task information memory, but the full-path information may be stored in the save register.

As described above, in the present second embodiment, a part of the OS configured by conventional software is converted into hardware, and whether or not the installed program is an object of a legitimate user is verified using the hardware OS. This makes it possible to achieve both the speed-up of the program processing of the microcontroller and the maintenance of the secure state.

It should be noted that the present invention is not limited to the above-mentioned embodiments, and various modifications can be made without departing from the gist thereof. For example, a file system which is a part of the OS may be realized by hardware, that is, a circuit.

What is claimed is:

1. A microcontroller comprising:
a central processing unit (CPU); and
a cryptographic circuit,
wherein the CPU executes a first program using the cryptographic circuit and a second program transmitting installation information of the first program and encrypted program installation information to the cryptographic circuit when the first program uses the cryptographic circuit,
wherein the cryptographic circuit decrypts the encrypted program installation information, compares the decrypted program installation information with installation information of the first program, and, when comparison results in a match, permits use of the cryptographic circuit by the first program,
wherein the second program transmits installation information of an installed program and the encrypted program installation information to the cryptographic circuit when installation of the program is performed, and
wherein the cryptographic circuit decrypts the encrypted program installation information, adds the installation information of the program to the decrypted program installation information, encrypts the program installation information to which the installation information is added.

2. The microcontroller according to claim 1, wherein the CPU operates an operating system, and the program installation information includes directory information in which a privileged user of the operating system can install a program.

3. The microcontroller according to claim 1, wherein the cryptographic circuit comprises at least one of a HASH circuit, a random number generation circuit, and an electronic certificate verification circuit, and is enabled when the comparison results in match.

4. The microcontroller according to claim 1, wherein the cryptographic circuit comprises an access management circuit that inhibits subsequent access when the comparison results in mismatch.

5. The microcontroller according to claim 1, wherein the second program is a driver for controlling a cryptographic process.

6. A microcontroller comprising:
a central processing unit (CPU); and
a cryptographic circuit,
wherein the CPU executes a first program using the cryptographic circuit and a second program transmitting installation information of the first program and encrypted program installation information to the cryptographic circuit when the first program uses the cryptographic circuit,
wherein the cryptographic circuit decrypts the encrypted program installation information, compares the decrypted program installation information with installation information of the first program, and, when comparison results in a match, permits use of the cryptographic circuit by the first program,
wherein the second program is a driver for controlling a cryptographic process, and
wherein the second program includes a plurality of drivers, and the CPU determines that an abnormality process is performed when the plurality of drivers is not executed in a predetermined order.

* * * * *